(12) United States Patent
Denk (10) Patent No.: US 7,508,870 B2
(45) Date of Patent: Mar. 24, 2009

(54) METHOD AND APPARATUS FOR CHANNEL ESTIMATION IN RADIO SYSTEMS BY MMSE-BASED RECURSIVE FILTERING

(75) Inventor: Robert Denk, Grafing (DE)

(73) Assignee: Infineon Technologies AG, Neubiberg (DE)

( * ) Notice: Subject to any disclaimer, the term of this patent is extended or adjusted under 35 U.S.C. 154(b) by 690 days.

(21) Appl. No.: 10/821,827

(22) Filed: Apr. 9, 2004

(65) Prior Publication Data
US 2004/0218702 A1 Nov. 4, 2004

(30) Foreign Application Priority Data
Apr. 11, 2003 (DE) ............... 103 16 803

(51) Int. Cl.
*H03H 7/30* (2006.01)
(52) U.S. Cl. .................... 375/229; 375/236; 375/232
(58) Field of Classification Search .......... 375/229–236
See application file for complete search history.

(56) References Cited

U.S. PATENT DOCUMENTS

| 5,243,624 | A | * | 9/1993 | Paik et al. ............... 375/232 |
| 5,757,844 | A | * | 5/1998 | Fukawa et al. ............ 375/136 |
| 5,995,544 | A | * | 11/1999 | Cherubini et al. ......... 375/232 |
| 6,445,692 | B1 | * | 9/2002 | Tsatsanis .................. 370/342 |
| 6,483,459 | B1 | * | 11/2002 | Hou et al. ................. 342/378 |
| 6,483,872 | B2 | * | 11/2002 | Nguyen .................... 375/231 |
| 6,628,224 | B1 | * | 9/2003 | Mulder et al. ............. 341/156 |
| 6,717,464 | B2 | * | 4/2004 | Fudaba et al. ............. 330/149 |
| 6,901,243 | B2 | * | 5/2005 | Jayaraman et al. ........ 455/63.1 |
| 6,954,618 | B2 | * | 10/2005 | Bonhomme ................ 455/65 |
| 7,082,174 | B1 | * | 7/2006 | Smee et al. ............... 375/349 |
| 7,099,386 | B2 | * | 8/2006 | Krupka .................... 375/232 |
| 7,136,410 | B2 | * | 11/2006 | Choi et al. ................ 375/148 |
| 2001/0031000 | A1 | * | 10/2001 | Nguyen .................... 375/231 |
| 2002/0042279 | A1 | | 4/2002 | Da Rocha et al. .......... 455/456 |
| 2003/0060167 | A1 | | 3/2003 | Bonhomme ................ 455/67.6 |
| 2003/0223489 | A1 | * | 12/2003 | Smee et al. ............... 375/233 |
| 2004/0037354 | A1 | * | 2/2004 | Jayaraman et al. ........ 375/229 |

OTHER PUBLICATIONS

J. Baltersee, et al.; "Performance Analysis of Phasor Estimation Algorithms for a FDD-UMTS RAKE Receiver"; IEEE 6th Int. Symp. on Spread-Spectrum Tech. & Appli. NJIT, New Jersey, Sep. 2000.
Simon Haykin; "Adaptive Filter Theory"; Prentice-Hall, Inc.; pp. 158-161, 1991.

* cited by examiner

*Primary Examiner*—David C Payne
*Assistant Examiner*—Linda Wong
(74) *Attorney, Agent, or Firm*—Dickstein, Shapiro, LLP.

(57) ABSTRACT

A sequence of unfiltered channel estimation values $x_k$ is determined in a method for calculation of filtered channel estimation values $d_k$ in radio systems. A specific set of filter coefficients is selected from two or more filter coefficient sets, with the filter coefficients being calculated on the basis of the MMSE optimality criterion for a predetermined recursive digital filter (F). The sequence of unfiltered channel estimation values is then filtered by means of this recursive digital filter (F) using the selected filter coefficients.

15 Claims, 3 Drawing Sheets

METHOD AND APPARATUS FOR CHANNEL ESTIMATION IN RADIO SYSTEMS BY MMSE-BASED RECURSIVE FILTERING

PRIORITY

This application claims priority to German application no. 103 16 803.6 filed Apr. 11, 2003.

TECHNICAL FIELD OF THE INVENTION

The invention relates to a method and an apparatus for calculation of filtered channel estimation values in radio systems, in particular in mobile radio systems.

BACKGROUND OF THE INVENTION

In mobile radio systems, the signals are propagated via a number of propagation paths between the transmitter and the receiver. The influence of this multipath propagation on the signal may be described in the form of a linear, time-variant transformation. The signal distortion which is caused by the multipath propagation makes correct detection of the transmitted data impossible without a correction mechanism. This correction mechanism, which is referred to as adaptive equalization, is based on continuously repeated measurement of the channel characteristics of the transmission channel (channel estimation). The information which is determined about the transmission channel during the channel estimation process is used for equalization of the received signal.

In order to allow channel estimation in the receiver, the transmitter transmits symbols which are known in the receiver. These symbols which are known in the receiver are referred to as pilot symbols. The receiver receives the distorted pilot symbols which are transmitted via the channel and compares them with the transmitted pilot symbols. The quotient of the pilot symbols as received via a specific propagation path and the known pilot symbols then results in the channel coefficient which is applicable to the relevant propagation path at that time. With optimum channel knowledge, the rotation and magnitude change which occur in the received complex-value symbol in the transmission path can be compensated for. This allows the data to be detected with a lower bit error rate.

Various known algorithms are available for channel estimation. The best known algorithm for channel estimation is signal-matched filtering (MF: Matched Filter). Signal-matched filtering does not require any knowledge about the statistical characteristics of the channel, and has a maximum signal-to-interference and noise ratio as the optimality criterion. Wiener filtering is an example of a channel estimation algorithm which takes account of statistical characteristics of the channel, such as those which are described by an appropriate stochastic channel model, in the estimation process. The optimality criterion for Wiener filtering is to minimize the mean square estimation error MMSE (Minimum Mean Square Error).

In practice, the channel estimation process is carried out as follows. In the following text, the sequence of transmitted complex pilot symbols is identified by $p_1$, $p_2$, for a single transmission path. The transmission channel multiplies the pilot symbol $p_k$ by the complex channel coefficient $c_k$. Noise $n_k$ is added to this, so that the symbol which is received via the propagation path under consideration is in the form $y_k = p_k \cdot c_k + n_k$, $k=1, 2, \ldots$, where k is the index for the discrete time at the symbol clock rate. The channel estimation process is normally carried out in two steps. The first step comprises correlation of the received pilot symbol with the transmitted pilot symbol, that is to say calculation of the quotient $x_k = y_k / p_k$. If there is no noise ($n_k=0$), then $x_k=c_k$. The quotient $x_k$ may be referred to as the unfiltered channel estimation value. In a second step, the sequence of unfiltered channel estimation values $x_k$ is now filtered in order to reduce the noise component.

Two approaches are used, in particular, for the filtering of the sequence $x_k$:

filtering by means of an FIR (Finite Impulse Response) filter with a specific filter length. As is known, FIR filters are non-recursive filters. The filter is constructed on the basis of an optimality criterion, which is known from statistical signal theory. In particular, an FIR filter may be used as an LMMSE (Linear Minimum Mean Square Error) estimator. The filter coefficients for the FIR filter are in this case calculated and are appropriately defined on the basis of the optimality criterion MMSE. One example of an FIR filter such as this which minimizes the mean square error is a Wiener filter.

The filtering process is carried out by means of an IIR (Infinite Impulse Response) filter. As is known, an IIR filter is a recursive filter. IIR filters are frequently used which carry out only a single recursion, that is to say they have a single delay element.

In both cases, sub-optimum variants are frequently chosen in the implementation. In particular, the optimum filter on the basis of the above criteria is dependent on the signal-to-interference and noise ratio SINR of the respective propagation path, and on the relative speed between the transmitter and the receiver. IIR filters are used in particular for low relative speeds. However, IIR filters are not very suitable for also being used at the same time as channel estimators for high speeds with sufficient accuracy. FIR filters must therefore be used between the transmitter and the receiver for high relative speeds. In order to avoid the complexity of the filter unit becoming excessive, predefined coefficient sets may be used for the FIR filter and for the IIR filter, which cover a sufficiently wide range of SINR and speeds.

The publication by J. Baltersee et al., "Performance Analysis of Phasor Estimation Algorithms for a FDD-UMTS RAKE Receiver", IEEE 6th Int. Symp. on Spread-Spectrum Tech. & Appli., NJIT, New Jersey, USA, Sep. 6-8, 2000 describes a channel estimator for a Rake receiver whose filter unit has an FIR filter with 15 filter coefficients for high speeds (120 km/h) and a recursive LMS Kalman filter of the IIR type for lower speeds.

SUMMARY OF THE INVENTION

The invention is based on the object of providing a filter unit for a channel estimator, which can cope with all the scenarios which occur (different SINR, different relative speeds between the transmitter and the receiver) with as little consumption of resources (chip area, power consumption) as possible. A further aim of the invention is to specify a method for filtering unfiltered channel estimation values which has or allows the characteristics mentioned above.

The object on which the invention is based can be achieved by a method for calculation of filtered channel estimation values in radio systems, comprising the following steps:

determining a sequence of unfiltered channel estimation values;

selecting a specific set of filter coefficients from two or more filter coefficient sets, with the filter coefficients being calculated on the basis of the MMSE optimality criterion for a predetermined recursive digital filter;

filtering of the sequence of unfiltered channel estimation values by means of the recursive digital filter using the selected filter coefficients in order to calculate the filtered channel estimation values.

The specific set of filter coefficients can be selected as a function of the relative speed between the transmitter and the receiver and of the signal-to-interference and noise ratio. Sets of filter coefficients can be made available, which are calculated for different relative speeds between the transmitter and the receiver and for any desired signal-to-interference and noise ratio, and wherein the selection and filter steps may comprise the steps of:

selecting a specific such set of filter coefficients as a function of the relative speed between the transmitter and the receiver;

filtering of sequences of unfiltered channel estimation values which are associated with different transmission paths, using the filter coefficients of the same selected such set.

The filter coefficients of such sets can be calculated by averaging over various values of the signal-to-interference and noise ratio in the MMSE optimization process.

The object can also be achieved by a method for calculation of filtered channel estimation values in radio systems, comprising the following steps:

calculating filter coefficients on the basis of the MMSE optimality criterion for two or more filter coefficient sets for a predetermined recursive digital filter;

determining a sequence of unfiltered channel estimation values;

selecting a specific set of filter coefficients from the filter coefficient sets;

filtering the sequence of unfiltered channel estimation values by means of the recursive digital filter.

The specific set of filter coefficients can be selected as a function of the relative speed between the transmitter and the receiver and of the signal-to-interference and noise ratio. Sets of filter coefficients are calculated for different relative speeds between the transmitter and the receiver and for any desired signal-to-interference and noise ratio, and wherein the selection and filter steps comprises the steps of:

selecting a specific set of filter coefficients as a function of the relative speed between the transmitter and the receiver;

filtering of sequences of unfiltered channel estimation values which are associated with different transmission paths, using the filter coefficients of the same selected specific set.

The filter coefficients of the sets can be calculated by averaging over various values of the signal-to-interference and noise ratio in the MMSE optimization process.

The object can further be achieved by an apparatus for calculation of filtered channel estimation values in radio systems, comprising means for determination of a sequence of unfiltered channel estimation values, and means for selection of a specific set of filter coefficients from two or more filter coefficient sets, with the filter coefficients being calculated on the basis of the MMSE optimality criterion for a predetermined recursive digital filter, wherein the predetermined recursive digital filter for filtering of the sequence of unfiltered channel estimation values uses the selected filter coefficients in order to calculate the filtered channel estimation values.

The means for selection of the specific set of filter coefficients can be designed to carry out the selection process as a function of the relative speed between the transmitter and the receiver and of the signal-to-interference and noise ratio. The apparatus may further comprise two or more sets of filter coefficients, with each set being calculated for a specific relative speed between the transmitter and the receiver and for any given signal-to-interference and noise ratio, and wherein the means for selection of a specific such set of filter coefficients is designed to make the selection as a function of the relative speed between the transmitter and the receiver, two or more digital filters are provided for filtering sequences of unfiltered channel estimation values which are each associated with different transmission paths, and the filters are configured using the same filter coefficients from the selected set. The filter coefficients of such sets can be calculated by averaging over different values of the signal-to-interference and noise ratio during the MMSE optimization.

In the method according to the invention for calculation of filtered channel estimation values, a sequence of unfiltered channel estimation values is first of all determined using a conventional procedure. One specific set of filter coefficients is selected from two or more filter coefficient sets. The filter coefficients in the various sets are in this case calculated on the basis of the MMSE optimality criterion for a predetermined recursive digital filter. The sequence of unfiltered channel estimation values is then filtered by means of this recursive digital filter using the selected filter coefficients in order to calculate the filtered channel estimation values.

The basic idea of the invention is thus to operate a recursive filter of a given design with filter coefficients which have been obtained by means of the MMSE criterion. Each set of filter coefficients for the filter thus represents an estimator (estimation algorithm) which is matched to the hardware structure and satisfies the MMSE criterion. Thus, in the case of a recursive filter structure such as that on which the invention is based, an optimization process is carried out using all the estimation methods which are described by the predetermined IIR filter with a given number of filter coefficients. This approach ensures that the available hardware structure (the predetermined filter) is used optimally while, on the other hand, the channel estimation process also uses optimality criteria (that is to say MMSE) from statistical signal theory.

A specific set of filter coefficients is preferably selected as a function of the relative speed between the transmitter and the receiver and of the signal-to-interference and noise ratio. If a sufficient number of filter coefficient sets are available in order to cover the entire range of the relative speeds and SINR values in question, sufficiently accurate channel estimation is ensured for all scenarios.

According to one advantageous embodiment variant of the method according to the invention, two or more sets of filter coefficients are available, with each set being calculated for a specific relative speed between the transmitter and the receiver, but for any desired SINR. Sets of filter coefficients such as these are selected solely as a function of the relative speed between the transmitter and the receiver. There is no need to take account of the SINR of the respective transmission path for the selection decision. The sequences of unfiltered channel estimation values which are associated with each of the different transmission paths are then filtered using the same filter coefficients from the same selected such filter coefficient set. The advantage of this procedure is that fewer filter coefficient sets need be provided, since the SINRs associated with each of the transmission paths are no longer required as selection parameters.

The apparatus according to the invention has a means for determination of a sequence of unfiltered channel estimation values, a means for selection of a specific set of filter coefficients from two or more filter coefficient sets, with the filter coefficients being calculated on the basis of the MMSE optimality criterion for a predetermined recursive digital filter, and a filter for filtering the sequence of unfiltered channel estimation values by means of this recursive digital filter using the selected filter coefficients in order to calculate the filtered channel estimation values. One advantage of the apparatus according to the invention is that only a single filter is required (in hardware) which, on the basis of the two or more filter coefficient sets, provides different estimation algorithms for all scenarios, with all the estimation algorithms satisfying the MMSE criterion.

Further advantageous refinements and developments of the invention are specified in the dependent claims.

BRIEF DESCRIPTION OF THE DRAWINGS

The invention will be described in the following text using an exemplary embodiment and with reference to the drawing, in which.

PREFERRED EMBODIMENTS OF THE INVENTION

Figure 1:
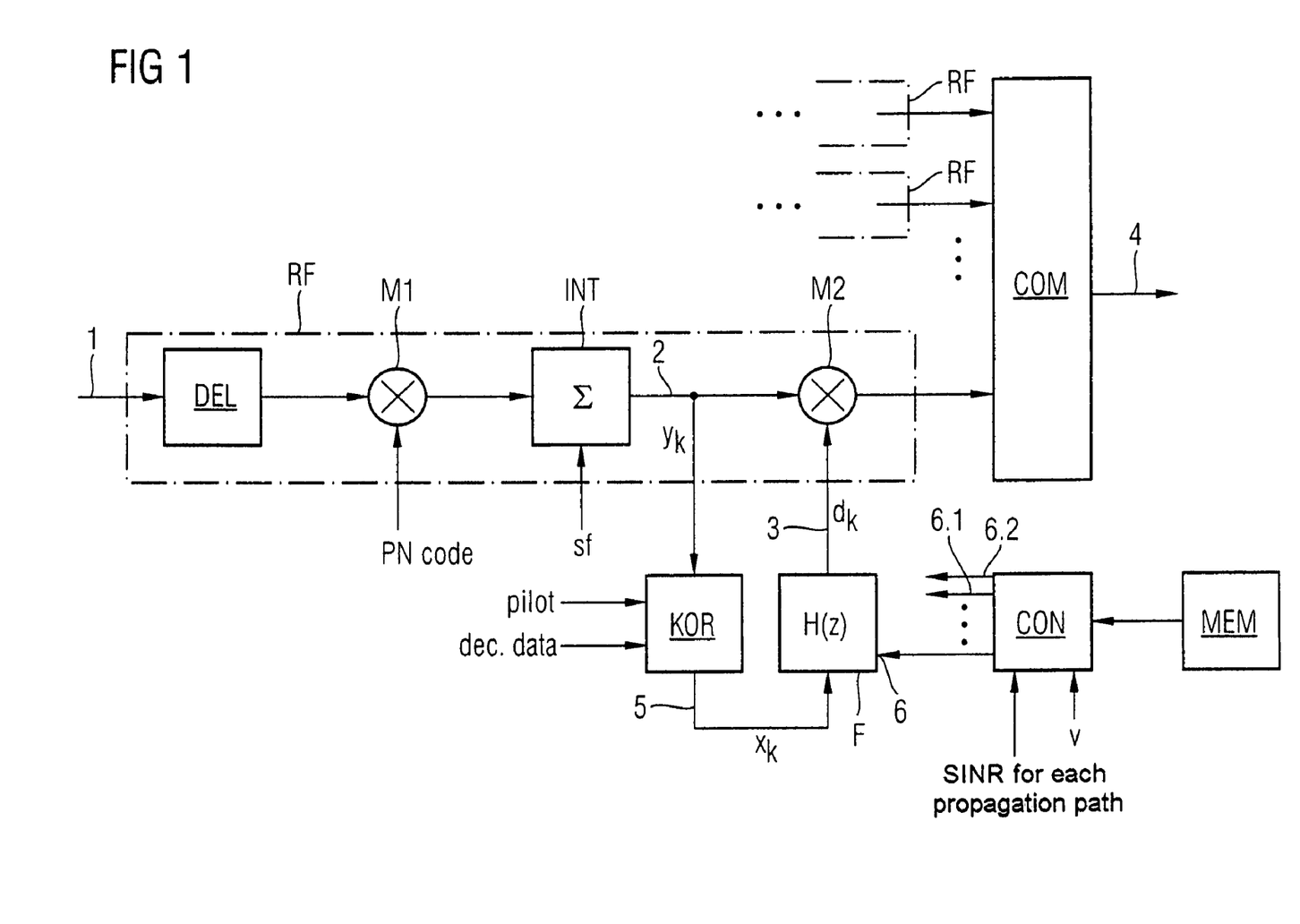
FIG. 1 shows a schematic illustration of a circuit of a Rake receiver with a channel estimator according to the invention associated with one finger of the Rake receiver.

As is shown in FIG. 1, a conventionally designed Rake receiver has two or more Rake fingers RF, whose outputs are supplied to a combiner COM. A digital signal 1 is supplied to the input side of the Rake fingers RF, of which only one is illustrated in detail by way of example in FIG. 1, with this digital signal 1 normally having been produced in the conventional manner (not illustrated) by down-mixing an antenna signal to an intermediate frequency band or to baseband and by sampling the down-mixed signal using a sufficiently high sampling frequency. The digital signal 1 is supplied to a delay element DEL whose object is to compensate for the path delay measured for a specific propagation path. A multiplier M1 is connected downstream from the delay element DEL in the signal path, in order to despread the delay-compensated digital signal. The signal which is emitted from the delay stage DEL is multiplied by a spreading code PN (pseudo noise) for this purpose.

An integrate and dump unit INT is located in the signal path downstream from the despreading stage M1. The integrate and dump unit INT integrates a total of sf values (chips) and in the process produces one symbol. sf denotes the spreading factor of the CDMA (Code Division Multiple Access) channel under consideration.

If the process is not based on the CDMA mobile radio system, there is no despreading stage M1 or integrate and dump unit INT.

The symbol sequence 2 which is emitted from the integrate and dump unit INT is passed to a further multiplier M2. The further multiplier M2 multiplies each symbol by an estimated channel coefficient $d_k$, which is passed to the multiplier M2 via a signal connection 3. As already mentioned, the output of the multiplier M2 is supplied to the combiner COM. The combiner COM uses the known functional principle of a Rake receiver to combine the signal outputs from those Rake fingers which demodulate the signal components, which are transmitted via different transmission paths, of one and the same signal. The signal which is produced at the output 4 of the combiner COM thus comprises signal contributions which have been obtained from two or more transmission paths.

The Rake receiver is followed by a data detector, in a manner which is not illustrated. The simplest form of data detection is for a decision maker to compare every combined symbol value that is obtained with a threshold value (for example 0.5) and to use the comparison result to decide whether the symbol is a 0 (signal value less than or equal to 0.5) or is a 1 (signal value greater than or equal to 0.5).

The aspect which is essential for the invention is the calculation of the channel coefficients $d_k$. In order to calculate the channel coefficients $d_k$, the signal 2 (whose symbol values are referred to as $y_k$) is passed to a correlator KOR. The correlator KOR compares the received symbol values $y_k$ of pilot symbols with the pilot symbols which are known in the receiver. As already explained, this comparison can be carried out by forming the quotient $x_k = y_k/p_k$ from the received pilot symbols $y_k$ and the transmitted pilot symbols $p_k$, which are known in the receiver. The channel estimation values $x_k$ are also referred to as unfiltered channel coefficients.

In the case of the UTRA-FDD standard, the pilot symbols $p_k$ are transmitted, for example, via a pilot channel CPICH (Common Pilot Channel) which is provided specifically for this purpose. Furthermore, the payload data channel may also contain pilot symbols for channel estimation. A further possible way to calculate the unfiltered channel coefficients $x_k$ is to compare the received symbols $y_k$ with symbols which are decided in the receiver (decided data). All known algorithms for the determination of the unfiltered channel coefficients $x_k$ may be used for the present invention.

The unfiltered channel coefficients $x_k$ are passed via a data link 5 to a digital filter F. The digital filter F is a recursive filter and has the transfer function $H(z)$. The digital filter F has a control input 6, via which the channel coefficients for the digital filter F can be preset. The transfer function $H(z)$ of the digital filter F is dependent on the filter coefficients which are supplied via the control input 6. The filtered channel coefficients $d_k$ are produced at the output of the digital filter F.

The recursive digital filter F is controlled by means of a control unit CON. The control unit CON has access to a memory area MEM in which a predetermined number of filter coefficient sets are stored. The control unit CON selects one of the coefficient sets which are stored in the memory area MEM as a function of the relative speed v between the transmitter and the receiver, and as a function of the SINR of the relevant propagation path. The relative speed v and the SINR of each propagation path must be measured in the receiver for this purpose.

Each Rake finger RF is equipped with a correlator KOR and a physically identical recursive filter F. These further recursive filters F are driven via outputs 6.1, 6.2 from the control unit CON. Since the propagation paths may have different SINRs, different coefficient sets may be used for driving the recursive filters F.

Figure 2:
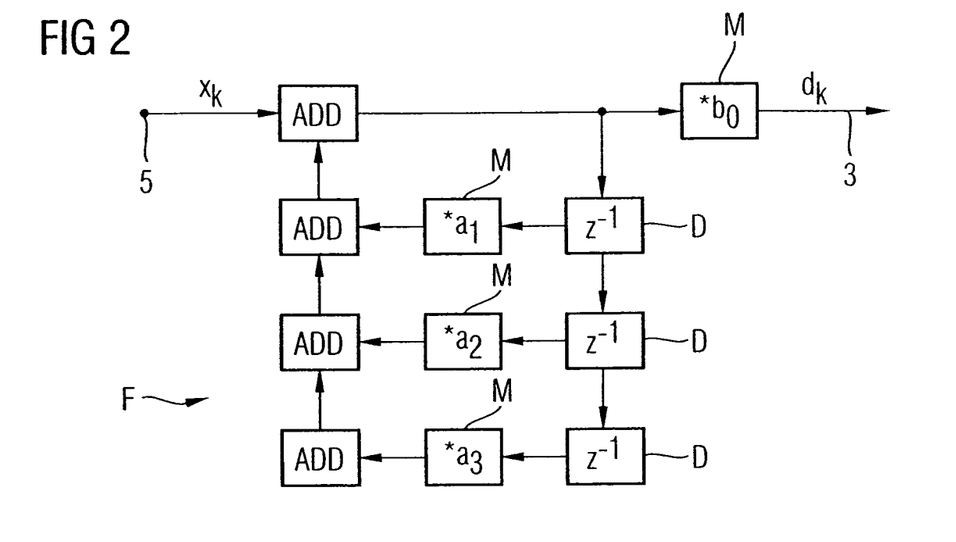
FIG. 2 shows an illustration of the circuit of the filter shown in FIG. 1 with three delay elements.

The recursive filter F may, for example, have three delay elements D, each of which produces a delay of one symbol time period (that is to say one time unit as indicated by the time index k), as shown in FIG. 2. The outputs of the delay elements D are each passed to multipliers N, which can be programmed by filter coefficients $a_1$, $a_2$ and $a_3$. The outputs of the multipliers M are added by means of three adders ADD. The addition result is added "recursively" to the input symbol value $x_k$ by means of a further adder ADD. A further multiplier M, which can be programmed by means of a further filter coefficient $b_0$, is located at the output of the filter F. The filter coefficients $a_1$, $a_2$, $a_3$, $b_0$ form a filter coefficient set.

The transfer function of this filter F is:

$$H(z) = \frac{b_0}{1 - a_1 z^{-1} - a_2 z^{-1} - a_3 z^{-1}} \quad (1)$$

The MMSE condition for the choice of the optimum filter coefficients is: select those coefficients $a_1$, $a_2$, $a_3$, $b_0$ which result in the expected value of $|c_k - d_k|^2$ being minimized. As already mentioned, $c_k$ denotes the actual channel coefficients of one propagation path of the actual physical transmission channel, and $d_k$ denotes the corresponding estimation value. The target function to be minimized is implicitly given by the structure of the filter F. The coefficient sets which are stored in the memory area MEM are thus formed by minimizing the expected value of the stochastic variable $|c_k - d_k|^2$ as a function of the coefficients $a_1$, $a_2$, $a_3$, $b_0$, as predetermined by the filter structure, for one specific range of SINR and for one specific speed range. The coefficient sets may be found analytically or by means of numerical methods, in advance, by simulation calculation.

Figure 3:
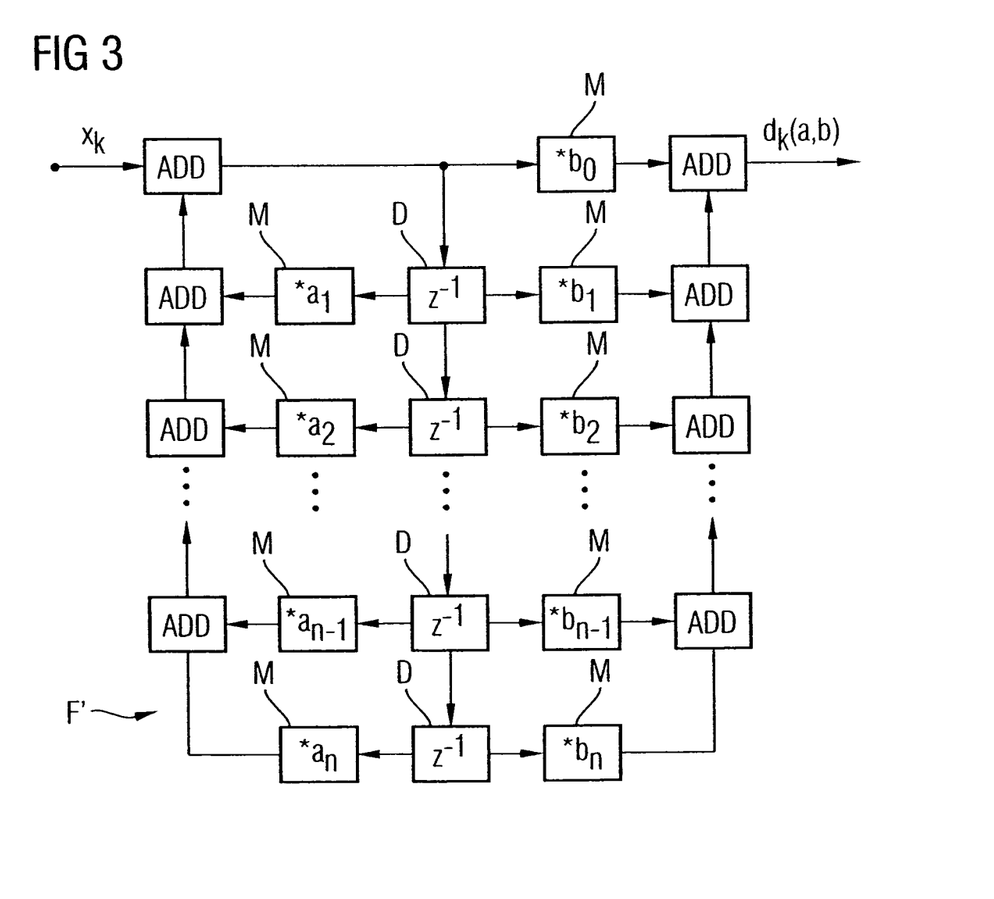
FIG. 3 shows a general illustration of a circuit for a filter according to the invention for filtering unfiltered channel estimation values.

FIG. 3 shows the general configuration of a recursive filter F' according to the invention with n delay elements D. In the following text, the coefficients $a_1$, $a_2$, ..., $a_n$ and $b_0$, $b_1$, ..., $b_n$ of the filter F' are referred to in summarized form by the designations a and b, respectively. The choice of the filter coefficients (a,b) can then be described in general by the following method:

The unfiltered channel estimation values $x_k$ are used as the input for the filter F'. The filtered channel estimation values are generally referred to as $d_k(a,b)$, since they depend on the filter coefficients a,b. A filter coefficient set is denoted by (a,b). Those filter coefficients for which the expected value $$E(|d_k(a,b) - c_k|^2) \quad (2)$$

is a minimum are selected for the general filter structure F' shown in FIG. 3 on the basis of the MMSE optimality criterion. The filter coefficients obtained in this way are optimum in the sense of the MMSE criterion for all estimation methods which can be implemented by the general filter F'.

In comparison to an FIR filter, coefficients calculated using the MMSE criterion make it possible to considerably reduce the number of delay elements D used for the filter structure F' which is used in the invention.

As already explained, the optimum filter coefficients generally depend on the SINR of the respective propagation path and on the relative speed v between the base station and the mobile station. In particular, the filter coefficients differ for each propagation path since the propagation paths have different SINR values. The criterion mentioned above may be generalized by averaging over S different SINR values $\rho_s$, where s=1,...,S. This allows an optimum filter coefficient set (a,b) to be determined for the various SINR values $\rho_1$, ..., $\rho_s$ and for a standard speed v for all propagation paths by minimizing the target function $$\sum_{s=1}^{S} |E^{(\rho_s)}(|d_k(a, b) - c_k|^2) - \min_{a'b'} E^{(\rho_s)}[|d_k(a', b') - c_k|^2]| \quad (3)$$

over the filter coefficients of the filter F' (or F). It should be mentioned that the minimum which occurs in the above equation (3) and the associated optimum coefficients a' and b' also depend on the respective SINR value $\rho_s$. In contrast, the filter coefficients (a,b) are identical for all values of $\rho_s$, that is to say they are independent of the SINR. The distance to the optimum achievable MMSE value is thus measured for each value of $\rho_s$, and these distances are then added up. Those coefficient sets (a,b) which minimize this sum are then selected for the filter arrangement. Coefficient sets (a,b) are calculated in this way for different speeds and for a universal SINR.

The advantage of this procedure is optimization of the channel estimation values $d_k(a,b)$ which have been filtered on the basis of the MMSE criterion, based on the simplifying assumption that the same filter coefficients may be used for all propagation paths. In this case, the outputs 6.1, 6.2 of the control unit CON are not required. The input SINR to the control unit CON is also not required.

The sets of SINR-universal optimum filter coefficients (a,b) according to equation 3 are likewise calculated in advance by simulation, either analytically or by means of numerical methods.

Figure 4:
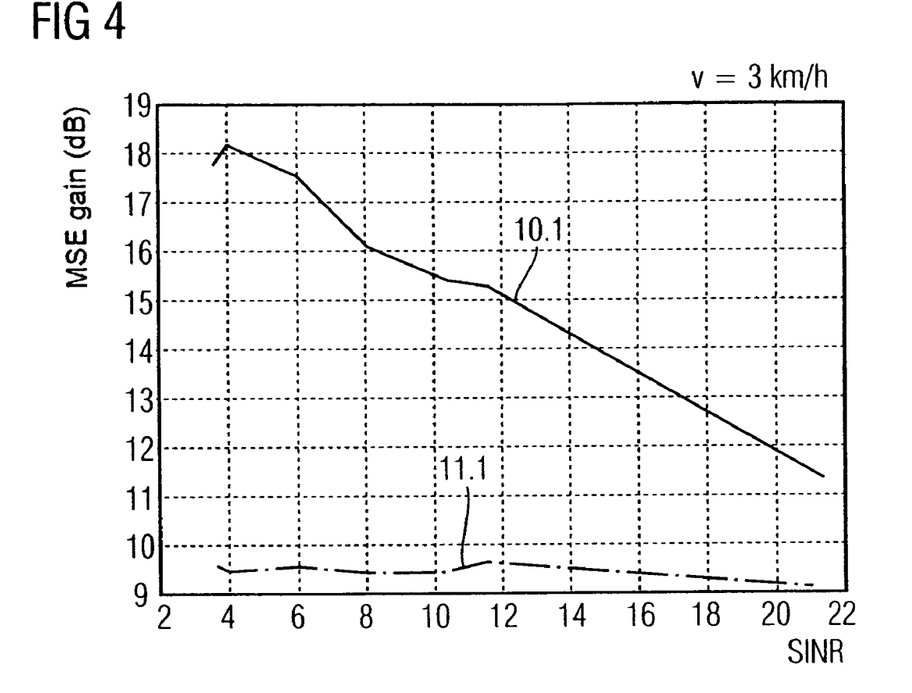
Figure 5:
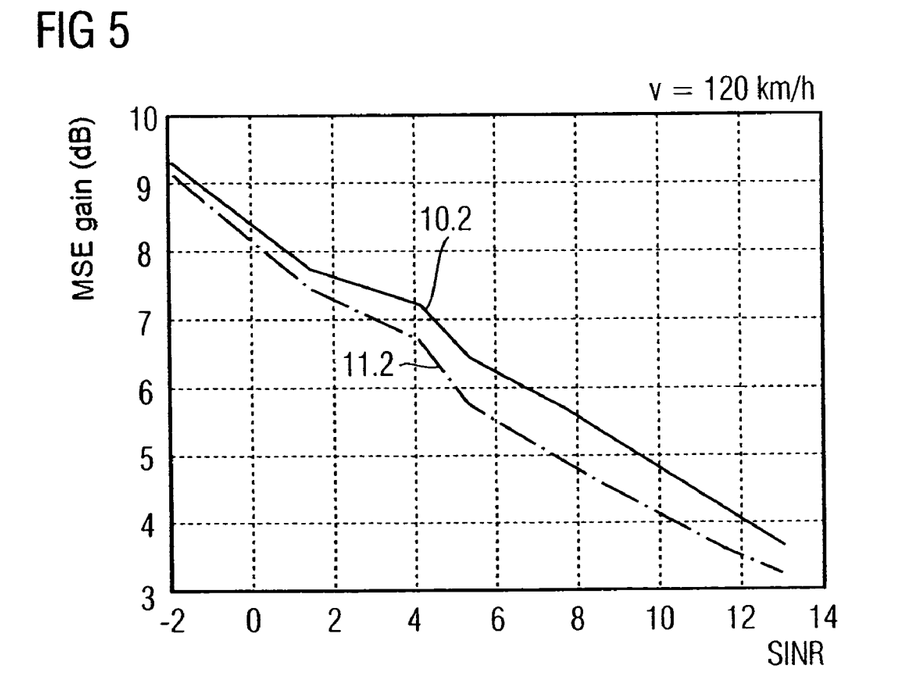

FIGS. 4 and 5 show the MSE gain (mean square error gain) in dB plotted against the SINR for a relative speed between the transmitter and the receiver of v=3 km/h (FIG. 4) and v=120 km/h (FIG. 5). The curves 10.1 and 10.2 show the MSE gain for the IIR filter F as illustrated in FIG. 2 with filter coefficients optimized according to equation (2), while the curves 11.1 and 11.2 show the MSE gain of a non-recursive FIR Wiener filter with eight delay elements. As can be seen, it was always possible to achieve a higher MSE gain with the IIR filter F with three delay elements (FIG. 2). If the channels are virtually static (v=3 km/h), the IIR filter F is considerably better while, at v=120 km/h, the FIR Wiener filter and the IIR filter F produce comparable results. Thus, the use according to the invention of an IIR filter F which has been set on the basis of the MMSE optimality criterion avoids the need to provide a second filter for high relative speeds. It should also be noted that the hardware complexity and the power consumption of the IIR filter F are considerably less than those of the FIR Wiener filter with eight delay elements, since the IIR filter F has only three delay elements D.

I claim:

1. A method for calculation of filtered channel estimation values in radio systems, comprising:

determining a sequence of unfiltered channel estimation values;

selecting a specific set of filter coefficients from two or more filter coefficient sets, with the filter coefficients being calculated on the basis of the MMSE optimality criterion for a predetermined recursive digital filter; and filtering of the sequence of unfiltered channel estimation values by means of the recursive digital filter using the selected filter coefficients in order to calculate the filtered channel estimation values, wherein each set of the two or more filter coefficient sets is independent of the signal-to-interference-and-noise ratio, and wherein each set of the two or more filter coefficient sets is calculated such that the respective set of filter coefficients minimizes a sum of error deviations at two or more different values of the signal-to-interference-and-noise ratio, wherein an error deviation is defined as the distance between the mean square error of the respective set of filter coefficients at a fixed signal-to-interference-and-noise ratio, and the respective optimally obtainable mean square error of a set of filter coefficients at the same fixed signal-to-interference-and-noise ratio.

2. The method according to claim 1, wherein the specific set of filter coefficients is selected as a function of the relative speed between the transmitter and the receiver and of the signal-to-interference and noise ratio.

3. The method according to claim 1, wherein sets of filter coefficients are calculated for different relative speeds between the transmitter and the receiver and for any desired signal-to-interference and noise ratio, and wherein the selection and filter steps comprises:

selecting a specific set of filter coefficients as a function of the relative speed between the transmitter and the receiver; and filtering of sequences of unfiltered channel estimation values which are associated with different transmission paths, using the filter coefficients of the same selected specific set.

4. The method according to claim 3, wherein the filter coefficients of said sets are calculated by averaging over various values of the signal-to-interference and noise ratio in the MMSE optimization process.

5. An apparatus for calculation of filtered channel estimation values in radio systems, comprising:

means for determination of a sequence of unfiltered channel estimation values, and means for selection of a specific set of filter coefficients from two or more filter coefficient sets, with the filter coefficients being calculated on the basis of the MMSE optimality criterion for a predetermined recursive digital filter, wherein the predetermined recursive digital filter for filtering of the sequence of unfiltered channel estimation values uses the selected filter coefficients in order to calculate the filtered channel estimation values, wherein each set of the two or more filter coefficient sets is independent of the signal-to-interference-and-noise ratio, and wherein each set of the two or more filter coefficient sets is calculated such that the respective set of filter coefficients minimizes a sum of error deviations at two or more different values of the signal-to-interference-and-noise ratio, wherein an error deviation is defined as the distance between the mean square error of the respective set of filter coefficients at a fixed signal-to-interference-and-noise ratio, and the respective optimally obtainable mean square error of a set of filter coefficients at the same fixed signal-to-interference-and-noise ratio.

6. The apparatus according to claim 5, wherein the means for selection of the specific set of filter coefficients is designed to carry out the selection process as a function of the relative speed between the transmitter and the receiver and of the signal-to-interference and noise ratio.

7. The apparatus according to claim 5, further comprising: two or more sets of filter coefficients, with each set being calculated for a specific relative speed between the transmitter and the receiver and for any given signal-to-interference and noise ratio, and wherein the means for selection of a specific set of filter coefficients is designed to make the selection as a function of the relative speed between the transmitter and the receiver, two or more digital filters are provided for filtering sequences of unfiltered channel estimation values which are each associated with different transmission paths, and the filters are configured using the same filter coefficients from the selected set.

8. The apparatus according to claim 7, wherein the filter coefficients of said sets are calculated by averaging over different values of the signal-to-interference and noise ratio during the MMSE optimization.

9. A method for calculation of filtered channel estimation values in radio systems, comprising:

calculating filter coefficients on the basis of the MMSE optimality criterion for two or more filter coefficient sets for a predetermined recursive digital filter;

determining a sequence of unfiltered channel estimation values;

selecting a specific set of filter coefficients from said filter coefficient sets; and filtering the sequence of unfiltered channel estimation values by means of the recursive digital filter, wherein each set of the two or more filter coefficient sets is independent of the signal-to-interference-and-noise ratio, and wherein each set of the two or more filter coefficient sets is calculated such that the respective set of filter coefficients minimizes a sum of error deviations at two or more different values of the signal-to-interference-and-noise ratio, wherein an error deviation is defined as the distance between the mean square error of the respective set of filter coefficients at a fixed signal-to-interference-and-noise ratio, and the respective optimally obtainable mean square error of a set of filter coefficients at the same fixed signal-to-interference-and-noise ratio.

10. The method according to claim 9, wherein the specific set of filter coefficients is selected as a function of the relative speed between the transmitter and the receiver and of the signal-to-interference and noise ratio.

11. The method according to claim 9, wherein sets of filter coefficients are calculated for different relative speeds between the transmitter and the receiver and for any desired signal-to-interference and noise ratio, and wherein the selection and filter steps comprises the steps of:

selecting a specific set of filter coefficients as a function of the relative speed between the transmitter and the receiver; and filtering of sequences of unfiltered channel estimation values which are associated with different transmission paths, using the filter coefficients of the same selected specific set.

12. The method according to claim 11, wherein the filter coefficients of the sets are calculated by averaging over various values of the signal-to-interference and noise ratio in the MMSE optimization process.

13. An apparatus for calculating filtered channel estimation values in a radio system, comprising:

a determiner configured to determine a sequence of unfiltered channel estimation values;

a recursive digital filter configured to filter the unfiltered channel estimation values in order to calculate the filtered channel estimation values, the recursive digital filter being configured to use a specific one from two or more filter coefficient sets; and a selector configured to select the specific set of filter coefficients from the two or more filter coefficient sets, with the filter coefficients being calculated based on the MMSE optimality criterion for the recursive digital filter, wherein each set of the two or more filter coefficient sets is independent of the signal-to-interference-and-noise ratio, and wherein each set of the two or more filter coefficient sets is calculated such that the respective set of filter coefficients minimizes a sum of error deviations at two or more different values of the signal-to-interference-and-noise ratio, wherein an error deviation is defined as the distance between the mean square error of the respective set of filter coefficients at a fixed signal-to-interference-and-noise ratio, and the respective optimally obtainable mean square error of a set of filter coefficients at the same fixed signal-to-interference-and-noise ratio.

14. The apparatus according to claim 13, wherein the filter coefficients of said sets are calculated by averaging over various values of the signal-to-interfere and noise ratio in the MMSE optimization process.

15. An apparatus for calculating filtered channel estimation values in radio systems, comprising:

a determiner configured to determine a sequence of unfiltered channel estimation values; and a selector configured to select a specific set of filter coefficients from two or more filter coefficient sets, the filter coefficients being calculated based on the MMSE optimality criterion for a predetermined recursive digital filter, wherein the predetermined recursive digital filter is configured to filter the sequence of unfiltered channel estimation values using the selected filter coefficients in order to calculate the filtered channel estimation values, wherein each set of the two or more filter coefficient sets is independent of the signal-to-interference-and-noise ratio; and wherein each set of the two or more filter coefficient sets is calculated such that the respective set of filter coefficients minimizes a sum of error deviations at two or more different values of the signal-to-interference-and-noise ratio, wherein an error deviation is defined as the distance between the mean square error of the respective set of filter coefficients at a fixed signal-to-interference-and-noise ratio, and the respective optimally obtainable mean square error of a set of filter coefficients at the same fixed signal-to-interference-and-noise ratio.

* * * * *

UNITED STATES PATENT AND TRADEMARK OFFICE
CERTIFICATE OF CORRECTION

PATENT NO. : 7,508,870 B2 Page 1 of 1
APPLICATION NO. : 10/821827
DATED : March 24, 2009
INVENTOR(S) : Robert Denk It is certified that error appears in the above-identified patent and that said Letters Patent is hereby corrected as shown below:

Col. 5, line 27, below "values." insert -- Figures 4 and 5 shows the MSE gain plotted against the SINR for the relative speed between the transmitter and receiver. --, therefor.

Col. 7, line 60, delete "$\min_{a,b}$," and insert -- $\min_{a',b'}$ --, therefor Col. 9, line 1, Claim 2, delete "claim l," and insert -- claim 1, --, therefor.

Col. 9, line 5, Claim 3, delete "claim l," and insert -- claim 1, --, therefor.

Signed and Sealed this

Fourth Day of August, 2009

JOHN DOLL
*Acting Director of the United States Patent and Trademark Office*